United States Patent
Smith

(10) Patent No.: US 6,264,711 B1
(45) Date of Patent: Jul. 24, 2001

(54) CAPTURE OF LIQUID SANDING DUST ATOMIZED OVERSPRAY BLAST MEDIA AND OTHER ERRANT PARTICLES IN AN UNENCLOSED AREA

(76) Inventor: William Smith, 4701 Willard Ave., Chevy Chase, MD (US) 20815

(*) Notice: Subject to any disclaimer, the term of this patent is extended or adjusted under 35 U.S.C. 154(b) by 0 days.

(21) Appl. No.: 09/447,888

(22) Filed: Nov. 24, 1999

(51) Int. Cl.$^7$ ................................................ B01D 46/00
(52) U.S. Cl. ................................. 55/385.1; 55/DIG. 18; 55/DIG. 46; 118/326; 454/50; 454/53; 454/63
(58) Field of Search .................... 454/50, 53, 54, 454/55, 119, 63, 65; 55/385.1, 385.2, DIG. 18, DIG. 46; 118/326

(56) References Cited

U.S. PATENT DOCUMENTS

| | | | |
|---|---|---|---|
| 3,257,989 | * 6/1966 | Webb | 118/326 |
| 3,803,997 | * 4/1974 | Van Raden | 55/DIG. 46 |
| 4,532,886 | * 8/1985 | Bouchard | 55/DIG. 46 |
| 4,770,088 | * 9/1988 | Kistner | 454/50 |
| 4,851,261 | * 7/1989 | Gelain et al. | 55/DIG. 46 |
| 4,932,354 | * 6/1990 | Kistner | 55/DIG. 46 |
| 4,934,308 | * 6/1990 | Boyce et al. | 55/DIG. 46 |
| 5,088,511 | * 2/1992 | Bain | 454/55 |
| 5,393,345 | 2/1995 | Smith | 118/312 |
| 5,688,323 | * 11/1997 | Kane et al. | 118/326 |
| 5,688,329 | * 11/1997 | Poague | 118/326 |
| 5,690,740 | 11/1997 | Smith | 118/300 |
| 6,143,048 | * 11/2000 | Comproni et al. | 55/385.1 |
| 6,171,656 | * 1/2001 | Settles | 454/50 |

OTHER PUBLICATIONS

Airless Overspray Control, The Diverter, Advertisement, no date.
JPCL, Aug. 1999, pp. 57, Indian Valley Industries Envirotarps.
Containment Covers, Armorlon, Advertisement.

* cited by examiner

Primary Examiner—Duane S. Smith
(74) Attorney, Agent, or Firm—Tom Hamill, Jr.

(57) ABSTRACT

An apparatus for the capture of overspray, blast media particles, and errant particle generated during spraying without employing an enclosure is disclosed. The apparatus is to be employed proximal a worker on a platform. The overspray capture mechanism is located intermediate the platform and the object being sprayed of coated. The mechanism includes a centrally supported suction duct which exerts a negative pressure in the area, the duct extends from the work area to a filtration area proximal a pump. A generally rectangular, flexible capturing device surrounds the duct. The flexible capture device is located intermediate a first and second support. The first and second supports include hydraulic elements which control the position of the supports and hence the flexible capture device. By use of the capturing device, liquid buildup, overspray or errant particles will be caused to move to and into the suction duct and then to a filtration system. In this fashion, the overspray and errant particles would be channeled into a filtered area and no physical enclosure is required proximal the spraying area.

14 Claims, 3 Drawing Sheets

CAPTURE OF LIQUID SANDING DUST ATOMIZED OVERSPRAY BLAST MEDIA AND OTHER ERRANT PARTICLES IN AN UNENCLOSED AREA

BACKGROUND OF THE INVENTION

1. Field of the Invention

The present invention relates to the collection of overspray in a barrier free environment.

2. Description of the Prior Art

Devices to capture overspray are known in the art. Large enclosed tent-like containment devices completely endose the object to be sprayed to comply with state and federal regulations concerning air pollution. The instant invention is a non-enclosed device which would obviate the use of such containment devices and comply with existing state and federal regulations.

SUMMARY OF THE INVENTION

An apparatus for the capture of liquids, sanding dust, welding metallic particulates, powders, atomized overspray, blast media particles, odors, explosive fumes and any other errant particles generated during a spraying process without employing an enclosure is disclosed. During the application of atomizable liquids, powders, paints, coatings, chemical solvents and the like, using spray technology such as that described in U.S. Pat. No. 5,690,740 and U.S. Pat. No. 5,393,345, some overspray occurs. Such spraying is often done on a manlift, a vertically ascending bucket, especially in shipyard and larger industrial applications. Other mechanisms which can convey a platform vertically, such as a scissor platform, may be employed with this invention. The overspray capture mechanism is located intermediate the manlift and the object (ship, aircraft, building, hangar, bridge) being sprayed. The overspray capture mechanism comprises a centrally supported suction duct. The centrally supported suction duct exerts a negative pressure. Surrounding the centrally supported suction duct is a flexible barrier comprised of any well known flexible material. The flexible barrier is fixed to a first support which runs horizontally and is secured centrally to the manlift. This first support has a right side and a left side, both sides extending beyond the horizontal length of the manlift. The flexible barrier is further secured to a second support which parallels the first support, and may be of equal or greater length, and also includes a right side and a left side. At the terminus of the both the right side and the left side of both the first and second supports is provided a right controlled arm member and left controlled arm member. The arm members may be hydraulically controlled. By manipulating these two arms, the cloth and ancillary area surrounding proximal the manlift is adapted to assume one of many different configurations. By employing the arms and the above mentioned spray devices, and by the negative pressure of the suction duct the overspray is routed to the centrally supported suction duct which would be connected to a filtration system intermediate a vacuum source. In this fashion, the errant particles would be channeled into a filtered area and no physical enclosure is required. In this embodiment, the second arm may be adapted to conform to the contour of the object being sprayed.

Another embodiment of the current invention includes another unenclosed area for the capture of overspray and errant particles caused during the spraying of an object which includes a platform. This platform is also both vertically and horizontally movable. The platform is designed to hold the worker and is attached to a first elongated element, said first elongated element having a right side and a left side. Affixed to the first elongated element is a duct supporting surface.

The duct supporting surface has a front side, a back side, a right side and a left side. The duct supporting surface back side is affixed centrally and perpendicularly from the first elongated element. The duct supporting surface includes a suction duct affixed thereto, from which a suction tube would be attached. The device will include a second elongated element, the second elongated element having a right side and a left side, where the left side is pivotally connected to said duct supporting surface front right side. The device will further Include a third elongated element, the third elongated element also having a right side and a left side, where the right side is pivotally connected to said duct supporting surface front left side. Attached atop the elongated elements is a flexible horizontal element or flexible barrier. A first hydraulic arm is located on the right side between the first elongated element and the second elongated element and a second hydraulic arm is located on the left side between the first elongated element and the third elongated element. By actuation of the hydraulic elements, the second and third elongated members may conform to the contour of whatever object is being sprayed.

This permits a worker on the platform to spray a material which generates overspray on an object, where the overspray is drawn into said suction duct due to the action of the vacuum and any other errant particles are captured on said horizontal flexible surface.

It has been found that by employing certain spray gun technologies, that overspray and errant particles can be directed downward. Such devices include those disclosed in U.S. Pat. No. 5,690,740 and U.S. Pat. No. 5,393,345, both issued to William C. Smith. By using the above spray guns with the non-enclosure device discussed above, one can literally direct the overspray into the vacuum duct giving us a very powerful and useful tool. It is to also be noted that the instant invention may be employed with any spray gun, and that by increasing the vacuum, one may control the overspray more completely.

It is therefore an object of the invention to provide an unenclosed area to capture overspray.

It is another object of the invention to provide an unenclosed area to capture overspray, which has advantages when certain sprayers are employed.

It is another object of the invention to provide an unenclosed area to capture overspray which includes an elongated member which will conform to the contour of the object being sprayed.

It is another object of the invention to provide an unenclosed area to capture overspray which may be utilized in the spraying of ships, aircraft, structures, bridges and the like.

It is still another object of the invention to provide an unenclosed area to capture overspray which keeps partides off of the worker, thus minimizing the possibilities for inhalation.

It is another object of the invention to provide an unenclosed area to capture overspray which may be used with existing manlift equipment.

With the above and other objects in view, the nature of the invention will be more clearly understood by reference to the following detailed description, the appended claimed subject matter, and the several views illustrated in the accompanying drawings.

DESCRIPTION OF THE PROFFERED EMBODIMENT

Figure 1:
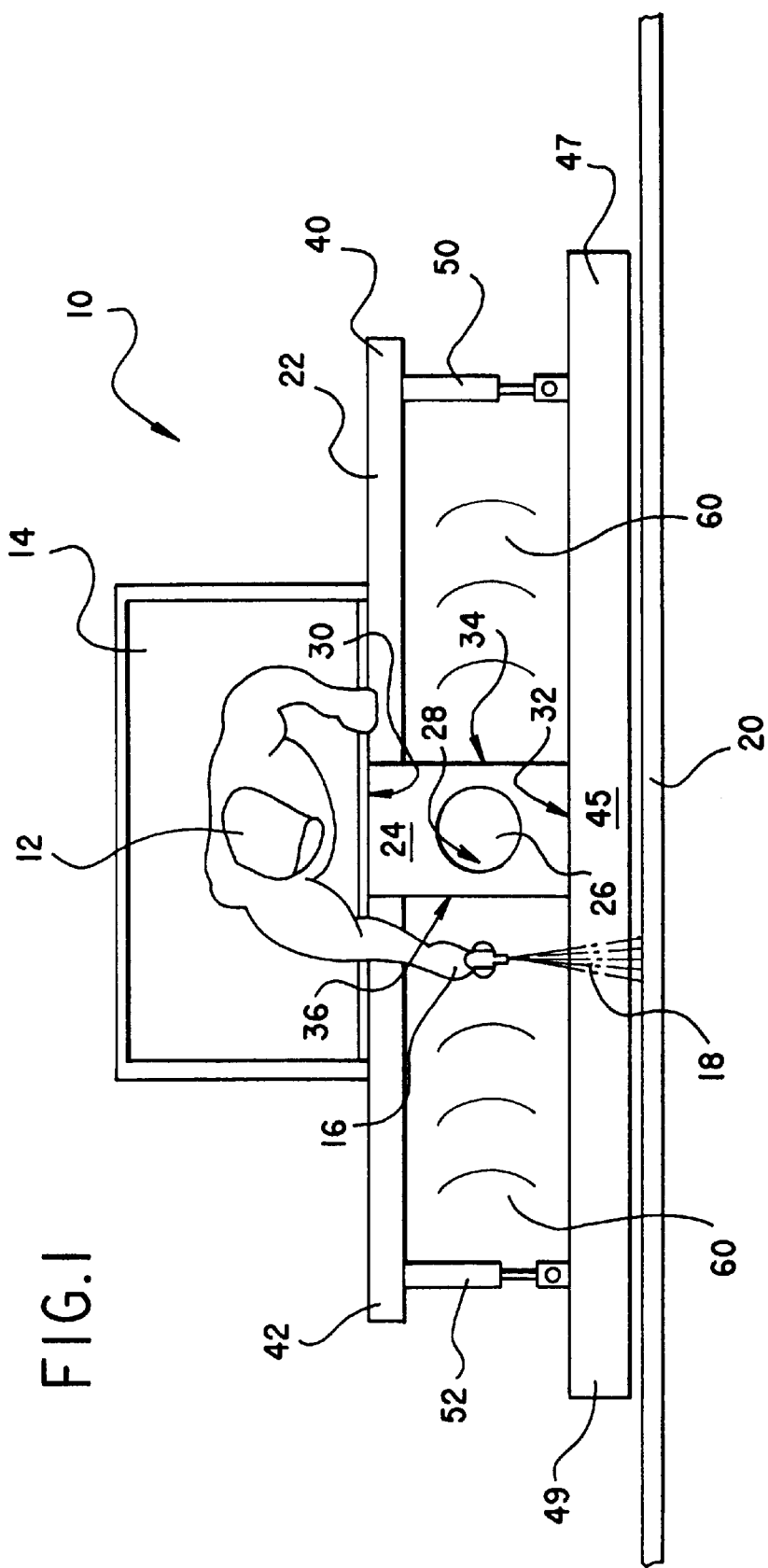
FIG. 1 is a first embodiment of an object being sprayed without an enclosure, the overspray being drawn down a suction duct.

Referring now specifically to FIG. 1, a first embodiment of the unenclosed area 10 to collect overspray and errant particles is shown. A worker 12 is shown standing on platform 14. Platform 14 may be any vertically and horizontally movable mechanism such as a manlift bucket, or any other such device which permits a worker to be brought to an area above a ground or bottom line. Worker 12 is using a spray gun 16 to spray 18 an object 20. The spray gun 18 may be employed to spray paints, pigments, powders, viscous material, thin solvents or other atomizable substances or substances that generate overspray or errant particles. The object 20 which is being sprayed may be any object, including, but not limited to, ships, aircraft, structures and bridges.

Platform 14 is connected to a first generally elongated support 22. The first generally elongated support 22 has a right side 40 and a left side 42. Affixed centrally and depending from the first elongated support 22 is a generally rectangular element 24 which has a central aperture 26. Depending below the aperture 26 is a tube 28 connected to a vacuum source. Intermediate the vacuum source and the aperture 26 a filtration system or the like filter may be present Rectangular element 24 has a back side 30, a front side 32, a right side 34 and a left side 36. It is easily seen that the back side 30 of the rectangular element 24 is connected to the first generally elongated support 22.

A second generally elongated support 45 is generally parallel to the first generally elongated support 22. The second elongated support 45 includes a right side 47 and a left side 49. The front side 32 of the rectangular element 24 is connected to the second generally elongated support 45. A first hydraulic arm 50 is connected to the right side 40 of the first elongated element 22 and to the right side 47 of the second elongated element 45. A second hydraulic arm 52 is connected to the left side 42 of the first elongated element 22 and the the left side 49 of the second elongated element 45. Through actuation of the first hydraulic arm 50 and second hydraulic arm 52, the second elongated element 45 may be moved to and from the object being sprayed. The second elongated element 45 may be comprised of a material which may conform to different contours which may be found in different sections of an object or on different objects. Lying atop the first elongated element 22 and the second elongated element 45 is a flexible barrier 60. The flexible barrier 60 does not obscure aperture 26 and may be affixed to the right side 34 and the left side 36. The dimensional tolerance of the rectangular element 24 is sufficiently great to permit it to remain stable at both the minimum and maximum extension of the first hydraulic arm 50 and the second hydraulic arm 52. The dimensional tolerance of the flexible barrier 60 is also sufficiently great to permit it to remain stable at both the minimum and maximum extension of the first hydraulic arm 50 and the second hydraulic arm 52.

As worker 12 uses a spray gun 16 to spray 18 an object 20, overspray and errant particles are generated. This overspray will be pulled down tube 28 through aperture 26 by action of the vacuum. Particles larger than those which are atomized will fall on the flexible barrier 60. The vacuum may be increased or decreased depending on what is being sprayed as well as wind conditions. In such cases the use of a right or left deflector may be beneficial. Such deflectors would be perpendicular to the flexible barrier and be located at either the right or left side depending on specific conditions.

It has also been considered that a vacuum tube may be affixed to the right and left deflector if such deflector elements are employed. This may obviate the need for the centrally located tube 28. This may be accomplished by running a central tube with a Y connector under the platform, having a right tube connected to and through the right deflector as well as a left tube connected to and through the left deflector. The right and left tubes would be connected to the central tube at the Y connector underneath the platform. It can easily be seen that any of a variety of configurations are possible for the location of the vacuum tube and these are considered to be in the scope of the instant invention.

Again, it is well known that certain spray guns (such as U.S. Pat. No. 5,690,740 and U.S. Pat. No. 5,393,345) force overspray in a downward fashion through the action of their mechanism. The use of these previously mentioned spray devices would be advantageous when employing the instant invention for the capture of overspray.

Figure 2:
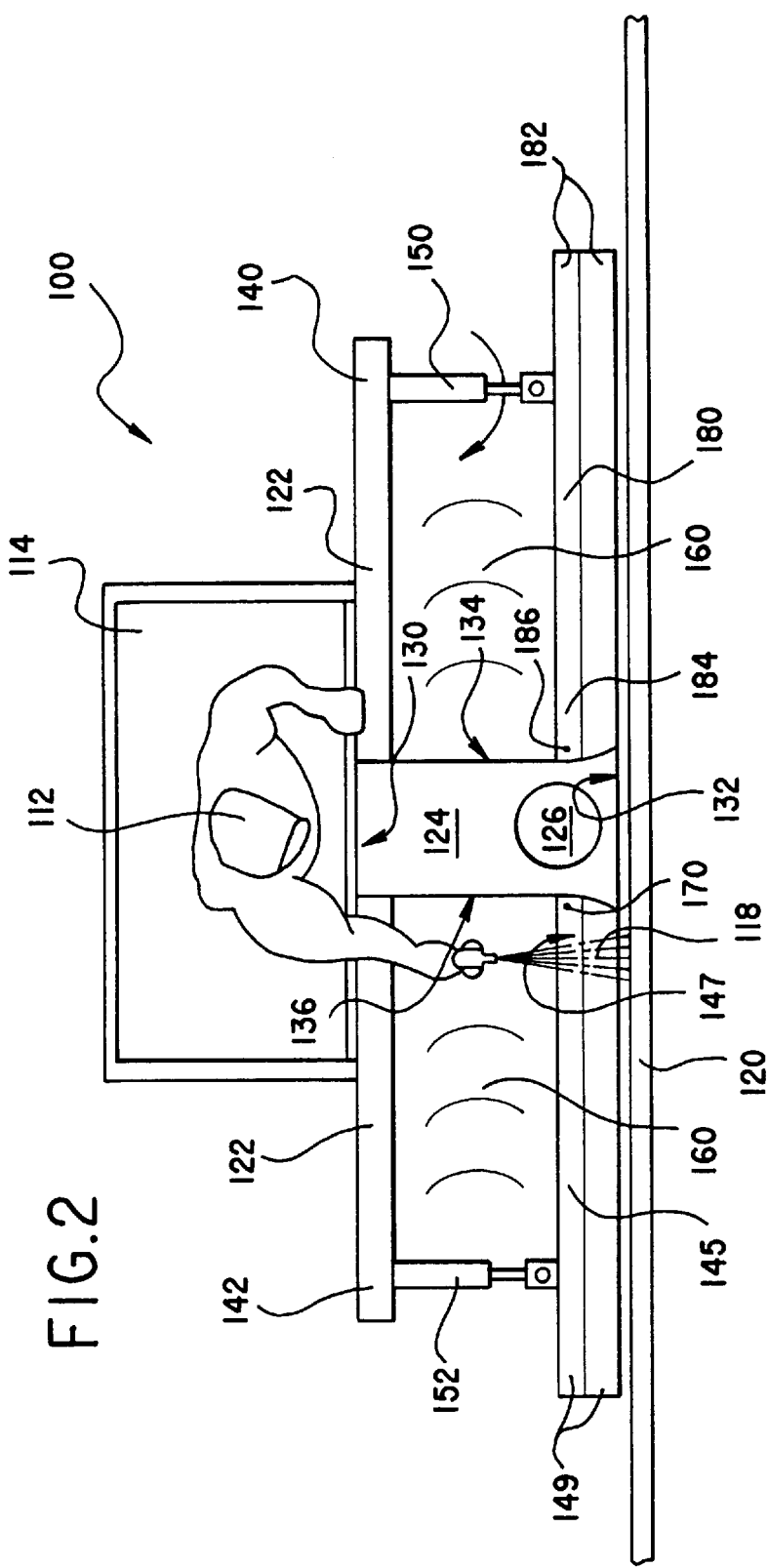
FIG. 2 is a second embodiment of an object being sprayed without an enclosure, the overspray being drawn down a suction duct.
Figure 3:
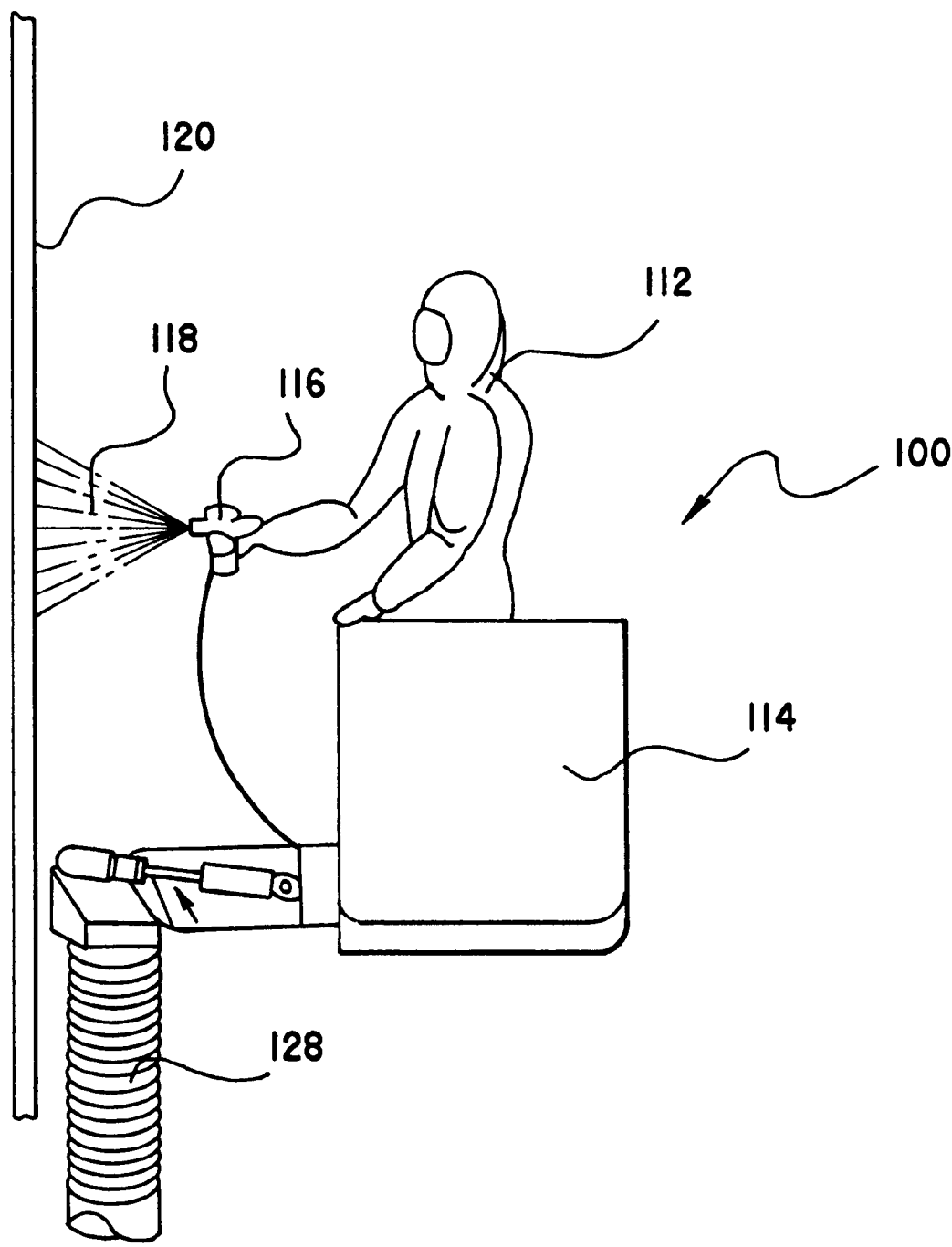
FIG. 3 is a side view of the second embodiment.

Referring now specifically to FIGS. 2 & 3, a second embodiment of the unenclosed area 100 to collect overspray and errant partides is shown. A worker 112 is shown standing on platform 114. Platform 114 may be any vertically and horizontally movable mechanism such as a manlift bucket, or any other such device which permits a worker to be brought to an area above a ground or bottom line. Worker 112 is using a spray gun 116 to spray 118 an object 120. The spray gun 116 may be employed to spray paints, pigments, powders, viscous material, thin solvents or other atomizable substances or substances that generate overspray or errant particles. The object 120 which is being sprayed may be any object, including, but not limited to, ships, aircraft, structures and bridges.

Platform 114 is connected to a first generally elongated support 122. The first generally elongated support 122 has a right side 140 and a left side 142. Affixed centrally and depending from the first elongated support 122 is a generally rectangular element 124 which has a central aperture 126. Depending below the aperture 126 is a tube 128 connected to a vacuum source. Intermediate the vacuum source and the aperture 126 a filtration system may be present Rectangular element 124 has a back side 130, a front side 132, a right side 134 and a left side 136. It is easily seen that the back side 130 of the rectangular element 124 is connected to the first generally elongated support 122.

A second generally elongated support 145 is generally parallel to the first generally elongated support 122. The second elongated support 145 includes a right side 147 and a left side 149. The left side 136 of the rectangular element 124 is pivotally connected to the second generally elongated support 145 at first pivot 170. A second hydraulic arm 152 is connected to the left side 142 of the first elongated element 122 and to the left side 149 of the second elongated element 145.

A third generally elongated support 180 is generally parallel to the first generally elongated support 122. The third elongated support 180 includes a right side 182 and a left side 184. The right side 134 of the rectangular element 124 is pivotally connected to the third generally elongated support 180 at second pivot 186. A first hydraulic arm 150 is connected to the right side 140 of the first elongated element 122 and to the right side 182 of the third elongated element 180.

By action of the second hydraulic arm 152 the second elongated element 145 may be moved to and from the object 120 being sprayed. By action of the first hydraulic arm 150 the third elongated element 180 may be moved to and from the object 120 being sprayed. In this fashion many different configurations of the unenclosed area may be generated.

The second elongated element 145 and third elongated element 180 may be comprised of a material which may conform to different contours which may be found in different sections of an object or on different objects. Lying atop the first elongated element 122, the second elongated element 145, and the third elongated element 180 is a flexible barrier 160. The flexible barrier 180 does not obscure aperture 126 and may be affixed to the right side 134 and the left side 136. The dimensional tolerance of the rectangular element 124 is sufficiently great to permit it to remain stable at both the minimum and maximum extension of the first hydraulic arm 150 and the second hydraulic arm 152. The dimensional tolerance of the flexible barrier 160 is also sufficiently great to permit it to remain stable at both the minimum and maximum extension of the first hydraulic arm 150 and the second hydraulic arm 152.

As worker 112 uses a spray gun 118 to spray 118 an object 120, overspray and errant particles are generated. This overspray will be pulled down tube 128 through aperture 126 by action of the vacuum. Partides larger than those which are atomized will fall on the flexible barrier 160. The vacuum may be increased or decreased depending on what is being sprayed as well as wind conditions. Again, it is well known that certain spray guns (such as U.S. Pat. No. 5,690,740 and U.S. Pat. No. 5,393,345) force overspray in a downward fashion through the action of their mechanism. The use of these previously mentioned spray devices would be advantageous when employing the instant invention for the capture of overspray.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred versions of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. An unenclosed area for the capture of any errant particles and overspray caused during the spraying, sanding, grinding, cleaning or welding of an object comprising,
   a) a tube, said tube centrally affixed to and through a horizontal flexible surface, said tube generating a vacuum,
   b) said horizontal flexible surface being generally rectangular and having a front side, a back side, a right side and a left side,
   c) said front side being affixed to a first elongated element, said first elongated element being conformable to a variety of shapes,
   d) said rear side being affixed to a second elongated element,
   e) said second elongated element being affixed to a platform, said platform being vertically and horizontally movable, whereby
      a worker is placed on said platform where the spraying, sanding, grinding, cleaning, or welding is performed, generating overspray or errant particles proximal said object, where the overspray and errant particles are drawn into said tube due to the action of the vacuum and any other errant particles are captured on said horizontal flexible surface.

2. The unenclosed area as claimed in claim 1 wherein a first hydraulic arm is located generally on said right side intermediate said first elongated element and a second hydraulic arm is located generally on said left side intermediate said second elongated element.

3. The unenclosed area as claimed in claim 2 wherein said first hydraulic arm is independently movable and said second hydraulic arm is independently movable, permitting the distance from said first elongated element and said second elongated element to be changed.

4. An unenclosed area as claimed in claim 3 wherein said platform is a manlift bucket.

5. An unenclosed area as claimed in claim 1 wherein said tube includes a filtration system.

6. An unenclosed area for the capture of overspray and errant particles caused during the spraying, sanding, grinding, cleaning or welding of an object comprising,
   a) a platform, said platform being vertically and horizontally movable, said platform further being attached to a first elongated element, said first elongated element having a right side and a left side,
   b) a duct supporting surface having a front side, a back side, a right side and a left side, said duct supporting surface back side centrally and perpendicularly depending from said first elongated element, said duct supporting surface further having a suction duct affixed thereto,
   c) a second elongated element, said second elongated element having a right side and a left side, said right side pivotally connected to said duct supporting surface front right side,
   d) a third elongated element, said third elongated element having a right side and a left side, said right side pivotally connected to said duct supporting surface front right side,
   e) a flexible horizontal element, said flexible horizontal element connected between said first elongated element and said second elongated element, and between said first elongated element and said third elongated element, whereby
      a worker is placed on said platform where the spraying, sanding, grinding, cleaning, or welding is performed, generating overspray or errant particles proximal said object, where the overspray and errant particles are drawn into said tube due to the action of the vacuum and any other errant particles are captured on said horizontal flexible surface.

7. An unenclosed area for the capture of overspray and errant particles as claimed in claim 6 including a first hydraulic arm, said first hydraulic arm connected generally about said first elongated arm right side and generally about said second elongated arm right side.

8. An unenclosed area for the capture of overspray and errant particles as claimed in claim 7 including a second hydraulic arm, said second hydraulic arm connected generally about said first elongated arm left side and generally about said third elongated arm left side.

9. An unenclosed area for the capture of overspray and errant particles as claimed in claim 8 wherein by actuation of said first hydraulic arm said flexible horizontal element assumes a different configuration.

10. An unenclosed area for the capture of overspray and errant particles as claimed in claim 9 wherein by actuation of said second hydraulic arm said flexible horizontal element assumes a different configuration.

11. An unenclosed area as claimed in claim 6 wherein said platform is a manlift bucket.

12. An unenclosed area as claimed in claim 6 wherein said suction duct includes a tube descending therefrom, said tube includes a filtration system.

13. An unenclosed area as claimed in claim 7 wherein said second elongated member assumes a different position when said second hydraulic arm is actuated, permitting said second elongated element to conform to the contour of the object being sprayed.

14. An unenclosed area as claimed in claim 9 wherein said third elongated member assumes a different position when said first hydraulic arm is actuated, permitting said third elongated member to conform to the contour of the object being sprayed.

* * * * *